United States Patent [19]

Kähkipuro et al.

[11] Patent Number: 4,799,139
[45] Date of Patent: Jan. 17, 1989

[54] VOLTAGE REGULATION FOR THREE-PHASE INVERTERS

[75] Inventors: Matti Kähkipuro; Urpo Sten, both of Hyvinkää ; Pekka Nummi, Nurmijärvi; Pekka Hytti, Hyvinkää, all of Finland

[73] Assignee: Kone Elevator GmbH, Baar, Switzerland

[21] Appl. No.: 26,027

[22] Filed: Mar. 16, 1987

[30] Foreign Application Priority Data

Mar. 19, 1986 [FI] Finland ................................ 861143

[51] Int. Cl.⁴ ........................................... H02M 7/48
[52] U.S. Cl. ...................................... 363/95; 363/96; 363/98
[58] Field of Search ................... 363/95, 96, 97, 98, 363/41

[56] References Cited

U.S. PATENT DOCUMENTS

| | | | |
|---|---|---|---|
| 4,477,868 | 10/1984 | Steigerwald | 363/96 |
| 4,541,041 | 9/1985 | Park et al. | 363/98 |
| 4,559,593 | 12/1985 | Glannon | 363/98 |
| 4,597,037 | 6/1986 | Okado | 363/41 |
| 4,635,177 | 1/1987 | Shekhawat et al. | 363/98 |
| 4,730,246 | 3/1988 | Schwesig | 363/98 |

Primary Examiner—Peter S. Wong
Assistant Examiner—Jeffrey Sterrett
Attorney, Agent, or Firm—Sughrue, Mion, Zinn, Macpeak and Seas

[57] ABSTRACT

A method of and apparatus for regulating the control voltage of a three-phase inverter supplying an a.c. motor are provided, the inverter having a power stage implemented with semiconductor switches, and the output voltage of each inverter phase being measured in the voltage control. For rapidly improving the curve shapes of the inverter output by means of feedback, the control voltage of the pulse width modulator of each inverter phase is regulated by a voltage regulator. The control voltage obtained as output of the voltage regulator is derived from an actual value voltage formed from the output voltage of each inverter phase and a reference voltage.

8 Claims, 3 Drawing Sheets

VOLTAGE REGULATION FOR THREE-PHASE INVERTERS

FIELD OF THE INVENTION

The present invention relates to a method of and an apparatus for regulating the control voltage of a three-phase inverter supplying an a.c. motor, the inverter having a power stage implemented using semiconductor switches, and the inverter output voltage of each phase being measured in the voltage control.

BACKGROUND OF THE INVENTION

The frequency-controlled a.c. motor is the most advanced design, for instance, for use in elevators. With frequency control, the efficiency is high at all motor speeds, and the mains power factor is nearly unity. Frequency control is appropriate for both geared and gearless elevators, and at all speeds. Moreover, a simple and moderately priced squirrel cage motor can be used for the motor. In elevator use, a transistor inverter implemented with transistors is best suited for frequency control because with transistors it is possible to achieve the highest switching frequency among existing power electronics components. GTO thyristors may also be contemplated because they have approximately equal switching times, but main current switching is more complicated than with transistors because of the required switch protection.

If pulse width modulation is applied in the inverter with a comparator in sinusoidal and triangle voltage comparison without feedback, the current which the inverter supplies to the motor is not sufficiently sinusoidal, for instance, for elevator use because in the rectified intermediate voltage circuit, whence the three-phase a.c. voltage supplying the motor is obtained by rectification with the inverter, the voltage is not constant, and also for the reason that a semiconductor switch does not follow the control without delay. A third factor causing an error is the differential voltage which is caused by the voltage existing across the power electronics component used as semiconductor switch, compared with the voltage occurring with the other direction of current when the diode which lies in parallel with the semiconductor switch is conducting. In practice, the errors give rise to vibration in the motor, which for instance in elevator operation impairs the performance of the elevator and causes discomfort to the passengers.

Presently, current feedback is a procedure known in the state of the art in inverter technology as a method for improving the curve shape. The drawback of current feedback is slow response. This is caused by the fact that, in current feedback, the motor inductances introduce time constants. The control loop is as a rule the slower the greater the number of time constants. Moreover, current measuring elements are expensive because they are also required to be able to measure direct current.

BRIEF SUMMARY OF THE INVENTION

It is accordingly an object of the present invention to eliminate or at least mitigate the above-mentioned drawbacks.

According to the present invention, there is provided a method of regulating the control voltage of a three-phase inverter supplying an a.c. motor, the inverter having a power stage implemented using semiconductor switches, and the output voltage of each inverter phase being measured, comprising the steps of regulating the control voltage of a pulse width modulator in each phase of the inverter by means of a voltage regulator, and producing the control voltage, as an output from the voltage regulator, from an actual value voltage derived from an output voltage of each of the inverter phases and a reference voltage.

The preferred embodiment of the method according to the present invention includes deriving the actual value voltage from the output voltage of each inverter phase by combining a voltage measured at the output of the inverter with an artificial zero level comprising an a.c. voltage which varies at a frequency three times the basic frequency, the a.c. voltage being obtained by combining a pulsating d.c. positive voltage and a pulsating d.c. negative voltage obtained by full-wave rectification of a three-phase supply voltage.

That embodiment also includes producing the control voltage as output of the voltage regulator of each phase, from the actual value voltage by obtaining the difference of the actual value voltage and the reference input voltage, amplifying the difference and superimposing the amplified difference on the reference voltage.

This embodiment may further includes employing as the inverter a transistor inverter comprising transistors serving as semiconductor switches and controlling the transistors to produce the inverter output voltages.

Alternatively, the inventive method may be performed by employing employing as the inverter a GTO thyristor inverter having GTO thyristors serving as semiconductor switches and controlling the GTO thyristors to produce the inverter output voltages.

Apparatus is also provided, according to the invention, for regulating the control voltage of a three-phase inverter supplying an a.c. motor comprising means for controlling the control voltage of said pulse width modulator, said means comprising an actual value voltage forming means for deriving an actual value voltage from a voltage measured at an output of said inverter, and control voltage forming means for deriving said control voltage of said pulse width modulator from said actual value voltage and a reference voltage.

In the preferred embodiment of the inventive apparatus, the actual value forming means comprising first summing means for combining the positive voltage and the negative voltage to provide an a.c. voltage and second summing means for combining the voltage measured at the inverter output with the a.c. voltage.

Also, in this embodiment the control voltage forming means comprise differential means for comparing the actual value voltage and the reference voltage to provide a difference value, amplifier means for integrating the differenced value, and summing means for superimposing the integrated difference value thus obtained on the reference value to produce the control voltage in accordance with the momentary state of the a.c. motor.

Preferably, the inverter comprises a transistor inverter and controlled semiconductor switches in the power stage of the inverter comprise transistors or the inverter comprises a GTO thyristor inverter and controlled semiconductor switches in the power stage of the inverter comprise GTO thyristors.

When the voltage regulator according to the present invention is used, the ripple of the voltage is, due to the synthetic zero level, less of a detriment than in the case where a sinusoidal voltage is formed with reference to the mains zero. Moreover, in the regulator of the present invention the differential signal produced from the actual value and reference value voltages is amplified and superimposed on the reference voltage. By this superpositioning, faster control is achieved than by carrying the entire voltage control through the integrating amplifier of the regulator.

BRIEF DESCRIPTION OF THE DRAWINGS

Further objects, features and advantages of the invention are described below with reference to the accompanying drawings, wherein.

DESCRIPTION OF THE PREFERRED EMBODIMENT

In the following the operation of a voltage regulator 1 according to the present invention, working in phase A, is described with the aid of FIGS. 1, 2 and 3. The voltage regulators in phases B and C are similar to the voltage regulator 1 in phase A.

Figure 3:
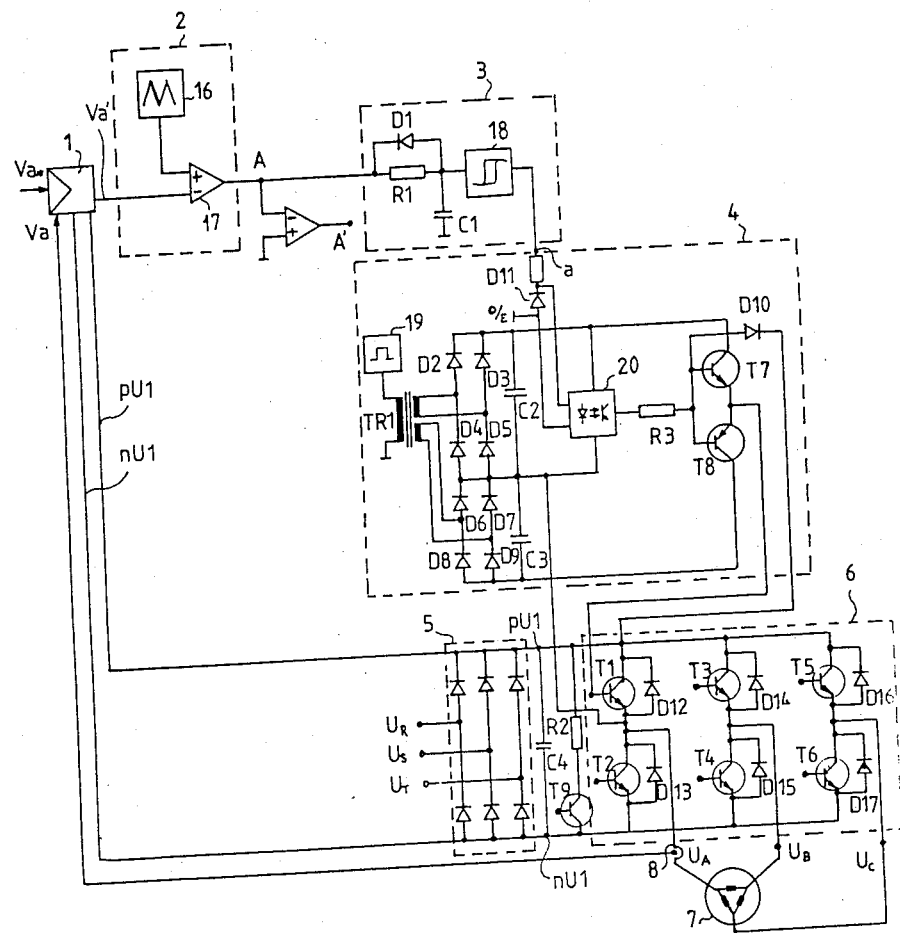
FIG. 3 presents an a.c. motor drive comprising a three-phase transistor inverter with voltage regulators according to the present invention.

In FIG. 3 there is illustrated an a.c. motor drive in which a transistor inverter provided with a voltage regulator according to the present invention is employed. The inputs of the voltage regulator 1 are a voltage Va, which is measured at the inverter output by a measuring element 8, and a reference voltage Va*. The provision of the reference voltage represents technology with which those skilled in the art are familiar and is not part of the subject matter of the present invention. From the output of the voltage regulator 1, a control voltage Va' for controlling a pulse width modulator 2 is obtained. The pulse width modulator 2 controls a transistor T1 in a main circuit 6 of the inverter through a delay circuit 3 and a control means 4. Transistors T1–T6 supply an a.c. motor 7. The power returning from the motor is applied to a resistor R2.

Figure 1:
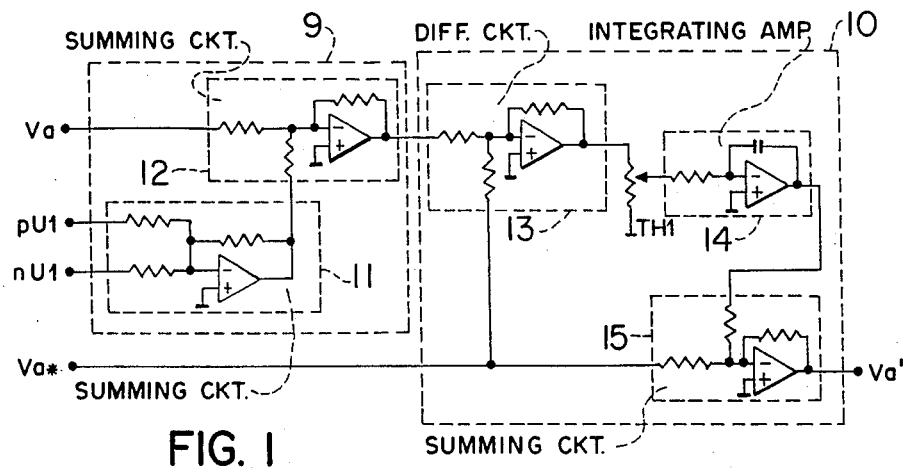
FIG. 1 presents a voltage regulator according to the present invention.

The design of the voltage regulator 1 is illustrated in FIG. 1. The voltage regulator comprises an actual value voltage forming circuit 9 and a circuit 10 for forming the control voltage Va' of the pulse width modulator. In the actual value voltage forming circuit 9, a summing unit 11 produces a synthetic zero level. The synthetic zero level is obtained by combining positive voltage pU1 and negative voltage nU1 of a pulsating d.c. voltage, appearing across a capacitor C4 and obtained by full-wave rectifying, by means of a diode rectifier bridge 5, the voltages of a three-phase mains supply, which has the phase voltages UR, US and UT, to provide an a.c. voltage V0. The positive voltage pU1, the negative voltage nU1 and the a.c. voltage V0 formed of these are depicted in FIG. 2. In a summing unit 12, the synthetic zero level a.c. voltage V0 is combined with the voltage Va measured at the inverter output.

In the pulse width modulator reference voltage forming circuit 10, a differential unit 13 forms the difference of the actual value voltage and the reference voltage Va*, this difference being controlled by an integrating amplifier 14. The differential unit 13 comprises a summing unit which has one of its two inputs negative. The gain of amplifier 14 can be changed with the aid of a trimmer TM1. In the summing unit 15, the reference voltage Va* and the correction component produced from the difference of the reference voltage Va* and the actual value voltage are superimposed to become the control voltage Va' of the pulse width modulator.

To obtain the desired pulse width modulation, the modulator 2 has to be regulated by this voltage. This modulator 2 is composed of a triangular wave generator 16 and a comparator 17. The triangular wave generator 16 is common to all phases A, B and C. The modulating digital signal is obtained at the output A and its complementary signal, at the output A'. The signal A controls the transistor of the inverter T1, and a signal A' controls the transistor T2.

It is necessary in this context to take into consideration the effect of storage time. That is, when the base current is removed from a transistor carrying current, the transistor remains conductive for about another twenty microseconds. During that time the transistor operating as the pair to the other must not be switched on, as a short-circuit would otherwise ensue. The transistor ceases to be conductive only after the charge on the base has dissipated. In FIG. 3, an asymmetric delay 3 has been introduced in the control of the transistor T1 with the aid of a hysteresis gate 18 so that the other transistor T2 might not be switched on before the transistor T1 has ceased to conduct. The delay of this circuit is determined by the product of resistor R1 and capacitor C1. The diode D1 is needed in order so that there is no delay in the switch-off operation.

The control means 4 of the transistor T1 has two floating power sources. A negative supply is required in order to have a powerful negative base current for rapid switch-off. The two floating voltages are produced by rectifier diodes D2–D9 and filtering capacitors C2 and C3. The power supply of the control means 4 is a high frequency chopper power supply 19, and the secondary winding of its transformer TR1 has enough turns to provide the requisite floating power supplies. Energy is supplied from the transformer TR1. An optoisolator 20 supplies the end stage transistors T8 and T9 via the resistor R3. The transistors T8 and T9 constitute a dual emitter follower circuit.

The diode D10 is a so-called Baker diode and prevents the power transistor proper, T1, from becoming saturated. This reduces and stabilizes the storage time. Furthermore, the switch-off power of the transistor is reduced due to the diode. The resistor R3 is needed for the Baker diode D10 to operate correctly. The control signal of the control means is inserted at the point a. The point 0/E represents the ground of the oscillator electronics. The diode D11 is the protective diode for the optoisolator 20.

The power supply of the main circuit 6 of the four-quadrant transistor inverter is in the present instance obtained by full-wave rectifying the phase voltages UR, US and UT of the three-phase mains with the diode bridge 5. In this way, a fixed intermediate voltage is produced across the capacitor C4. From the intermediate voltage is produced, by pulse width modulation, a three-phase voltage UA, UB and UC having a controlled frequency and amplitude. This controlled three-phase power controls the motor 7. The diodes D12–D17 are zero diodes constituting current paths for inductive currents while the transistor connected in parallel with the diode is switched off. The braking energy goes to the braking resistance R2 controlled by the braking transistor T9.

Figure 2:
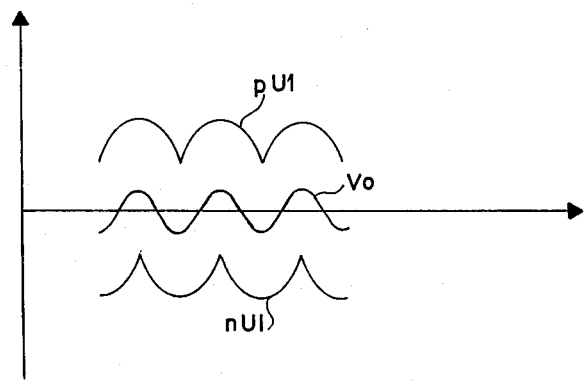
FIG. 2 shows the formation of a synthetic zero level.

As indicated above, FIGS. 1, 2 and 3 show the components in phase A of the a.c. motor drive. For further clarification, FIG. 4 also shows the corresponding components of phases B and C.

Figure 4:
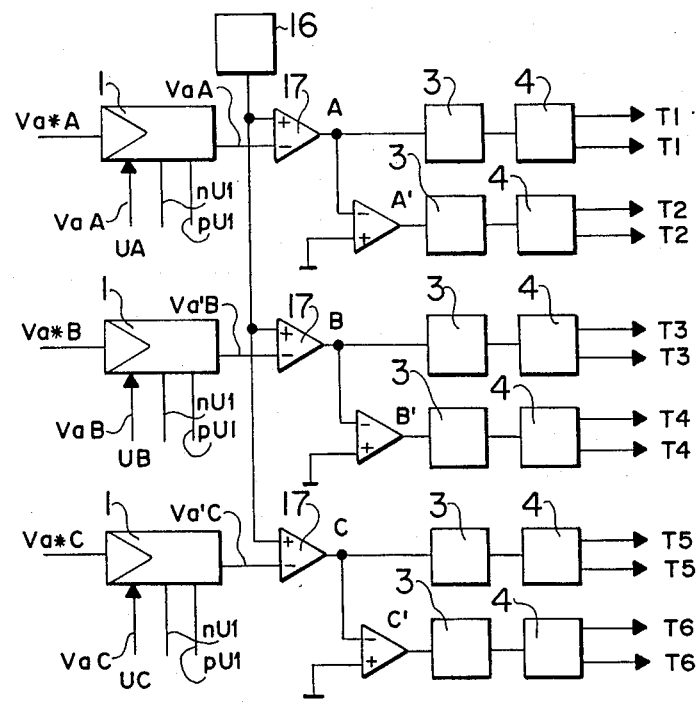
FIG. 4 shows the circuit means of FIG. 3 incorporated in each of the three phases of the voltage regulators according to the invention.

More particularly, as shown in FIG. 4 each of the three phases has a respective one of voltage regulator 1, comparator 17 and the associated amplifier for producing the respective output A', B' and C', these being connected in common to the triangular wave generator 16. Each phase A, B and C also has two delay circuits 3 and two control means 4 for connection to the two respective outputs A,A'; B,B' and C,C'.

It will be apparent to those skilled in the art that various embodiments of the invention are not restricted to the example presented in the foregoing, but may vary within the scope of the following claims. For example, in addition to a transistor inverter implemented with transistors, a thyristor inverter using GTO implemented with GTO thyristors is an example of another possible application of the voltage regulator of the invention.

We claim:

1. A method of regulating the control voltage of a threephase inverter supplying an a.c. motor, said inverter having a power stage implemented using semiconductor switches, and the output voltage (UA) of each inverter phase being measured, comprising the steps of:
   regulating a control voltage of a pulse width modulator in each individual one of the three phases of said inverter by means of a voltage regulator (1); and
   producing said control voltage (Va') as an output from said voltage regulator (1), from an actual value voltage derived from an output voltage (UA) of a respective one of said inverter phases and a reference voltage (Va*), wherein said control voltage (Va') is produced by obtaining the difference of said actual value voltage and said reference input voltage (Va*), amplifying said difference and superimposing said amplified difference on said reference voltage (Va*).

2. A method of regulating the control voltage of a three-phase inverter supplying an a.c. motor, said inverter having a power stage implemented using semiconductor switches, and the output voltage (UA) of each inverter phase being measured, comprising the steps of:
   regulating a control voltage of a pulse width modulator in each individual one of the three phases of said inverter by means of a voltage regulator (1); and
   producing said control voltage (Va') as an output from said voltage regulator (1), from an actual value voltage derived from an output voltage (UA) of a respective one of said inverter phases and a reference voltage (Va*), wherein said actual value voltage from said output voltage (UA) of each inverter phase is derived by combining a voltage (Va) measured at the output of said inverter with an artificial zero level comprising an a.c. voltage which varies at a frequency three times the basic frequency, said a.c. voltage being obtained by combining a pulsating d.c. positive voltage (pU1) and a pulsating d.c. negative voltage (nU1) obtained by full-wave rectification of a three-phase supply voltage.

3. A method according to claim 2, which includes producing said control voltage (Va') as output of said voltage regulator (1) of each phase, from said actual value voltage by obtaining the differnce of said actual value voltage and said reference input voltage (Va*), amplifying said difference and superimposing said amplified difference on said reference voltage (Va*).

4. A method according to claims 1 or 2, which includes employing as said inverter a transistor inverter comprising transistors (T1–T6) serving as semiconductor switches and controlling said transistors to produce said inverter output voltages (UA,UB,Uc).

5. Apparatus for regulating the control voltage of a three-phase inverter supplying an a.c. motor having a power stage implemented using semiconductor switches, comprising:
   three pulse width modulator means respectively associated with the three phases of said inverter;
   means for regulating control voltages of respective ones of said pulse width modulating means;
   said voltage regulator means each comprising an actual value voltage forming means for deriving an actual value voltage from a voltage (Va) measured at a respective one of three outputs of said inverter; and
   control voltage forming means for deriving said control voltage (Va') of the respective one of said pulse width modulators from said actual value voltage and a reference voltage (Va*), wherein said control voltage forming means comprise differential means for comparing said actual value voltage and said reference voltage (Va*) to provide a difference value, amplifier means for integrating said difference value, and summing means for superimposing the integrated difference value thus obtained on said reference value (Va*) to produce said control voltage (Va') in accordance with the momentary state of said a.c. motor.

6. Apparatus for regulating the control voltage of a three-phase inverter supplying an a.c. motor having a power stage implemented using semiconductor switches, comprising:
   three pulse width modulator means respectively associated with the three phases of said inverter;
   means for regulating control voltages of respective ones of said pulse width modulatng means;
   said voltage regulator means each comprising an actual value voltage forming means for deriving an actual value voltage from a voltage (Va) measured at a respective one of three outputs of said inverter; and
   control voltage forming means for deriving said control voltage (Va') of the respective one of said pulse width modulators from said actual value voltage and a reference voltage (Va*), further including means for effecting full-wave rectification of a three-phase voltage to provide a pulsating d.c. positive voltage (pU1) and a pulsating d.c. negative voltage (nU1), said actual value forming means comprising first summing means for combining said positive voltage (pU1) and said negative voltage (nU1) to provide an a.c. voltage (VO) and second summing means for combining said voltage (Va') measured at said inverter output with said a.c. voltage (VO).

7. Apparatus according to claims 5 or 6, wherein said inverter comprises a transistor inverter and controlled semiconductor switches in the power stage of said inverter comprise transistors (T1–T6).

8. Apparatus according to claim 6 wherein said control voltage forming means comprise differential means for comparing said actual value voltage and said reference voltage (Va*) to provide a difference value, amplifier means for integrating said difference value, and summing means for superimposing the integrated difference value thus obtained on said reference value (Va*) to produce said control voltage (Va') in accordance with the momentary state of said a.c. motor.

* * * * *